(12) United States Patent
Bruck et al.

(10) Patent No.: US 6,810,670 B2
(45) Date of Patent: Nov. 2, 2004

(54) CORRUGATED CATALYST SUPPORT STRUCTURE FOR USE WITHIN A CATALYTIC REACTOR

(75) Inventors: Gerald J. Bruck, Murrysville, PA (US); William E. Kepes, Trafford, PA (US); Maria E. Stampahar, Trafford, PA (US); Thomas E. Lippert, Murrysville, PA (US); Bernd Prade, Muelheim (DE); Stefan Hoffmann, Muelheim (DE)

(73) Assignee: Siemens Westinghouse Power Corporation, Orlando, FL (US)

( * ) Notice: Subject to any disclaimer, the term of this patent is extended or adjusted under 35 U.S.C. 154(b) by 79 days.

(21) Appl. No.: 10/245,422

(22) Filed: Sep. 17, 2002

(65) Prior Publication Data

US 2004/0050054 A1 Mar. 18, 2004

(51) Int. Cl.[7] .............................. F02C 1/00; F02C 7/20
(52) U.S. Cl. ......................... 60/723; 60/799; 431/170; 502/527.22
(58) Field of Search .................. 60/723, 799; 431/7, 431/170; 502/527.19, 527.21, 527.22

(56) References Cited

U.S. PATENT DOCUMENTS

| | | |
|---|---|---|
| 2,095,065 A | 10/1937 | Hays |
| 4,190,559 A | 2/1980 | Retallick |
| 4,204,829 A | 5/1980 | Kendall et al. |
| 4,384,843 A | 5/1983 | Pfefferle |
| 5,190,453 A | 3/1993 | Le et al. |
| 5,250,489 A | 10/1993 | Dalla Betta et al. |
| 5,512,250 A | 4/1996 | Betta et al. |
| 5,518,697 A | 5/1996 | Dalla Betta et al. |
| 6,099,809 A * | 8/2000 | Foster et al. ............... 422/180 |
| 6,205,768 B1 | 3/2001 | Dibble et al. |
| 6,619,043 B2 * | 9/2003 | Bruck et al. ............... 60/723 |
| 6,660,401 B2 * | 12/2003 | Hsu ............... 428/593 |
| 2003/0192318 A1 * | 10/2003 | Sprouse et al. ............... 60/777 |

OTHER PUBLICATIONS

U.S. patent application Publication No. 2001/0018915, Publication Date Sep. 6, 2001, Entitled "Hot Water Heater for Diver Using Hydrogen Catalytic Reactions".

* cited by examiner

Primary Examiner—Charles G. Freay

(57) ABSTRACT

A catalytic section of a combustor is formed from a spaced tandem array of corrugated panels. The exterior top and bottom surfaces of the panels are coated with a catalyst and the space between panels defines a passage for a fuel-rich/air mixture. The interior of the corrugated panels define cooling air passages for maintaining the catalyst and substrate on which it is formed, at acceptable temperatures.

27 Claims, 6 Drawing Sheets

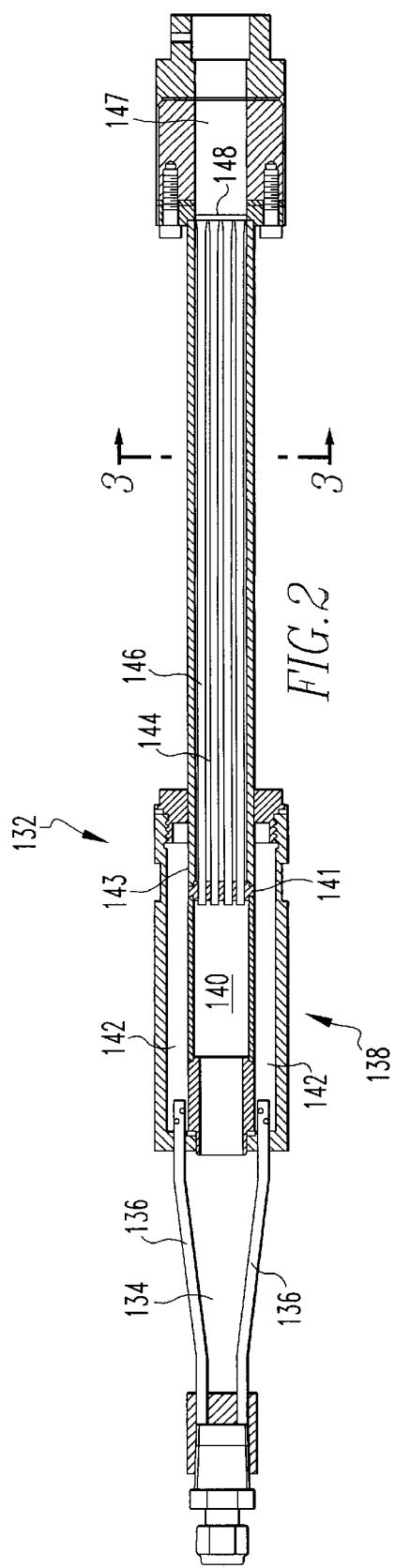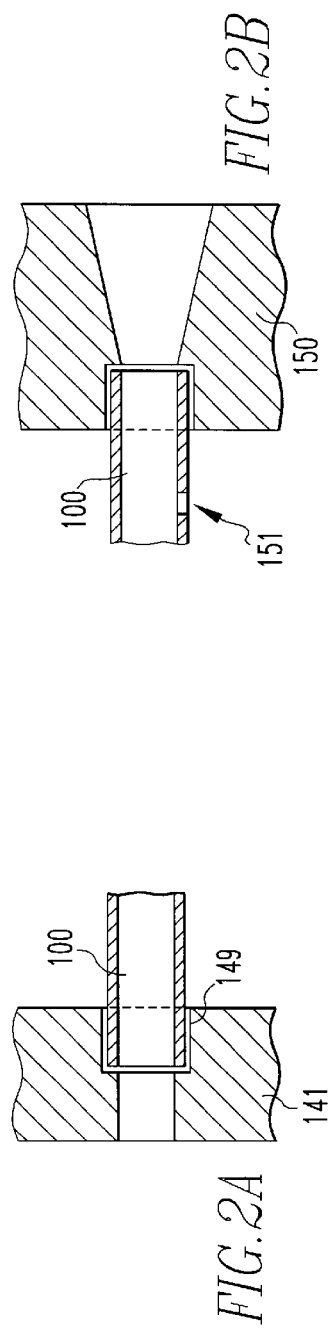

CORRUGATED CATALYST SUPPORT STRUCTURE FOR USE WITHIN A CATALYTIC REACTOR

BACKGROUND OF THE INVENTION

1. Field of the Invention

The present invention relates to catalytic reactors generally and, more specifically, to catalytic support structures for use within a combustor, particularly a combustor for a gas turbine.

2. Related Art

Combustion turbines generally have three main assemblies; a compressor assembly, a combustor assembly and a turbine assembly. In operation, the compressor compresses ambient air. The compressed air from the compressor flows into the combustor assembly where it is mixed with a fuel. The fuel and compressed air mixture is ignited, creating a heated working gas. The heated working gas is then expanded through the turbine assembly. The turbine assembly includes a plurality of stationary vanes and rotating blades. The rotating blades are coupled to a central shaft. The expansion of the working gas through the turbine section drives the blades which, in turn, rotate the shaft. The shaft may be connected to a generator to produce electricity.

Typically, the combustor assembly creates a working gas at a temperature between 2,500° F.–2,900° F. (1,371° C.–1,593° C.). At high temperatures, particularly above approximately 1,500° C., the oxygen and nitrogen within the working gas combine to form the pollutants NO and $NO_2$, collectively known as $NO_x$. The formation of $NO_x$ increases exponentially with flame temperature. Thus, for a given engine working gas temperature, the minimum $NO_x$ will be created by the combustor assembly when the flame is at a uniform temperature, that is, there are no hot spots in the combustor assembly. This is accomplished by uniformly premixing all of the fuel with all of the air available for combustion (referred to as low $NO_x$ lean-premix combustion) so that the flame temperature within the combustor assembly is uniform and the $NO_x$ production is reduced.

Lean-premixed flames are generally less stable than non well-mixed flames, as the high temperature/fuel rich regions of the non well-mixed flames add to a flame's stability. One method of stabilizing lean-premix flames is to react some of the fuel/air mixture with a catalyst prior to combustion. To utilize the catalyst, a fuel/air mixture is passed over a catalyst material, or through a catalyst bed, causing a pre-reaction of a portion of the mixture to create radicals which aid in stabilizing combustion at a downstream location within the combustor assembly.

Some prior art catalytic combustors completely mix the fuel and the air prior to exposing the mixture to the catalyst. This provides a fuel-lean mixture to the catalyst. However, typical catalyst materials are not active with a fuel-lean mixture at compressor discharge temperatures. A pre-burner is required to heat the air prior to exposing the fuel/air mixture to the catalyst in order for the catalyst to react with a fuel-lean fuel/air mixture to create radicals, which aid in stabilizing combustion. The preburner adds cost and complexity to the design as well as generates $NO_x$ emissions. It is, therefore, desirable to have a combustor assembly that burns a fuel-lean mixture, so that $NO_x$ is reduced, but passes a fuel-rich mixture through the catalyst bed so that a preburner is not required. The preburner can be eliminated because the fuel-rich mixture contains sufficient mixture strength at compressor discharge temperatures, without being preheated, to activate the catalyst and create the necessary radicals to maintain a steady flame. This is accomplished by providing one flow stream of compressed air richly mixed with fuel that passes over a catalyst bed. A second flow stream of compressed air is isolated from the first flow stream and is used to cool the catalyst bed. The two flow streams of compressed air are combined downstream of the catalyst bed just upstream of the point of ignition.

In such fuel-rich configurations, the catalyst and catalyst support structure temperatures must be controlled to avoid catalyst degradation, excessive substrate oxidation and pre-ignition or flashback conditions. Prior art configurations utilize a tube array geometry wherein cooling air is projected inside the tubes with the catalyst coating applied to the outside of the tubes. Such tube arrays are notoriously susceptible to vibration, degradation, fatigue and fretting induced by base system/engine vibrations and longitudinal (air and fuel-air) and traverse (fuel/air) flow effects. The vibration can result in both tube wall degradation as well as tube to tube sheet joint degradation, e.g., fatigue of brazed or welded joints. Methods applied or proposed for enhanced tube support to overcome the vibration problem have their own shortcomings. For example, intermediate tube supports may cause tube wearthrough due to fretting and can cause counter flow affects and nonuniform mixing. Also, intermediate tube bulges to effect intermediate support or tube flaring to effect end support cause wall thinning and can lead to premature tube failure.

Accordingly, there is a need for a catalyst support structure of improved resilience to vibratory effects. Additionally, there is need for such a structure that will provide for cooling of the substrate and catalyst. Furthermore, such a structure must be readily coatable to host the catalyst and cost effective to manufacture in production quantities.

SUMMARY OF THE INVENTION

The foregoing objects are achieved employing a combustion turbine combustor having an elongated catalytic section comprising a tandem arrangement of passages defined in part by first and second side walls, each of the side walls is provided with a plurality of grooves extending in the direction of the elongated dimension of the catalytic section. Alternate passages in the tandem arrangement are formed from a top plate and a bottom plate attached to and affixed together by an undulating member alternately forming ridges and grooves that respectively attach to the top and bottom plates to form a corrugated panel. The undulating member extends substantially from one lateral side of the panel to the other relative to the elongated dimension. Each of the corrugated members are supported at one lateral side within at least one of the grooves in one side wall and on the other lateral side within an at least one of the grooves in the other side wall.

In the preferred embodiment, the one lateral extending side of the top plate is supported within a first groove in the one side wall and the first laterally extending side of the bottom plate is supported within a second groove in the one side wall. Similarly, in this preferred embodiment, the other laterally extending side of the top plate is supported within a first groove in the other side wall and the other laterally extending side of the bottom plate is supported within a second groove in the other side wall. Preferably, one end of the undulating member is supported within either the first or second groove of the one side wall and the other end of the undulating member is supported within either the first or second groove of the other side wall. Each top side of the top plate and bottom side of the bottom plate is coated with a catalyst.

In one preferred embodiment, the corrugated members are connected to an upstream header and the interior of the corrugated members is in fluid communication through the header with a cooling air plenum. A fuel/air mixture plenum is provided in fluid communication with the catalytic lined passages in between the corrugated members. Both the cooling passages and the fuel/air mixture passages are joined at a mixing plenum downstream of the catalytic section to provide a catalytically-enhanced lean-fuel mixture for stable combustion.

BRIEF DESCRIPTION OF THE DRAWINGS

A further understanding of the invention can be gained from the following description of the preferred embodiments when read in conjunction with the accompanying drawings in which:

FIG. 2 is a side cross-sectional view of one embodiment of a catalytic combustor according to the present invention;

FIG. 2A is a cross-sectional view of a portion of the upstream header 141 shown in FIG. 2 illustrating the connection between the header and the corrugated panel.

FIG. 2B is a cross-sectional view of a portion of the downstream header shown in FIG. 2 illustrating the connection between the header and the corrugated panel.

DESCRIPTION OF THE PREFERRED EMBODIMENT

The preferred embodiments of the invention provide a catalyst supporting structure for a catalytic combustor. The catalyst supporting structure provides for improved resistance to vibrations, a decreased number of components in the catalytic assembly, an increased surface area having a catalytic coating within each sub-assembly and ease of manufacture. The significance and function of the present invention are best understood through a brief description of the environment within a combustion turbine for which a catalytic combustor is used.

Figure 1:
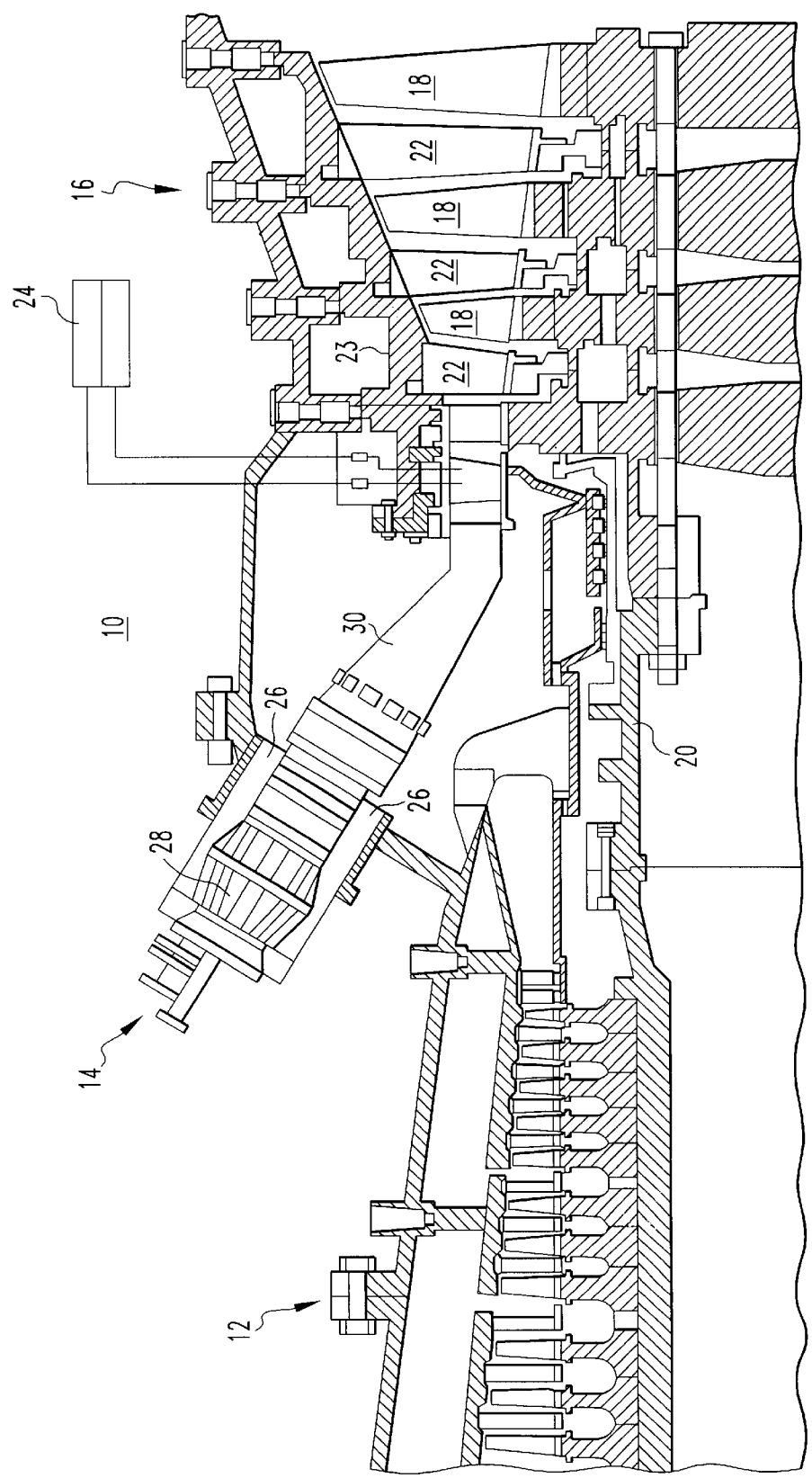
FIG. 1 is a cross-sectional view of a combustion turbine for which a catalytic combustor of the present invention may be used.

FIG. 1 illustrates a combustion turbine 10. The combustion turbine 10 includes a compressor 12, at least one combustor 14, and a turbine section 16. Typically, a plurality of combustors 14 are provided in a circular arc around the turbine shaft. The turbine section 16 includes a plurality of rotating blades 18, secured to a rotatable central shaft 20. A plurality of stationary vanes 22 are positioned between the blades 18 secured to a turbine cylinder 23. The vanes 22 are dimensioned and configured to guide the working gas over the blades 18.

In operation, air is drawn in through the compressor 12, where it is compressed and driven towards the combustor 14. The compressed air enters the combustor through an air intake 26. From the air intake 26, the air will typically enter the combustor at a combustor entrance 28, wherein it is mixed with fuel. The combustor 14 ignites the fuel/air mixture, thereby forming a working gas. The working gas is created typically at a temperature approximately equal to 2,500° F. to 2,900° F. (1,371° C.–1,593° C.). The gas expands through the transition member 30 and through the turbine 16, being guided by the vanes 22 to drive the rotating blades 18. As the gas passes through the turbine 16, it rotates the blades 18 which, in turn, drive the shaft 20, thereby transmitting usable mechanical work through the shaft 20. The combustion turbine 10 also includes a cooling system 24 dimensioned and configured to supply a coolant, for example, steam or compressed air, to internally cool the blades 18 and vanes 22.

Referring to FIG. 2, an embodiment of the catalytic assembly portion of a catalytic combustor is illustrated. The catalytic assembly portion 132 includes an air inlet 134 and a fuel inlet 136. The fuel and air are directed from the air inlet 134 and fuel inlet 136 into the mixer/separator portion 138. A portion of the air, roughly 80%, becomes the cooling air, travelling through the central cooling air plenum 140. The remaining air is directed towards the exterior mixing chambers 142 wherein it is mixed with fuel. The catalyst-coated channels or passages 144 and cooling channels or passages 146 are located downstream of the mixer/separator portion 138. With the catalyst coated channels 144 in communication with the mixing chambers 142, which injects the fuel/air mixtures through holes in the catalytic section walls 143, traverse to the elongated dimension of the catalytic section 132. The uncoated cooling channels 146 are in communication with the cooling air plenum 140 through a header 141. A fuel rich mixture is thereby provided to the catalyst-coated channels 144, resulting in a reaction between the fuel and the catalyst without the necessity of a preburner. The catalytic reaction raises the temperature of the fuel/air mixture. Upon exiting the catalyst-coated channels 144 and cooling air channels 146, the fuel/air mixture and cooling air mix within the downstream mixing plenum 147, thereby providing a fuel-lean mixture at the point of ignition expanding towards the turbine blades as the fuel/air mixture is ignited and burned.

Figure 3:
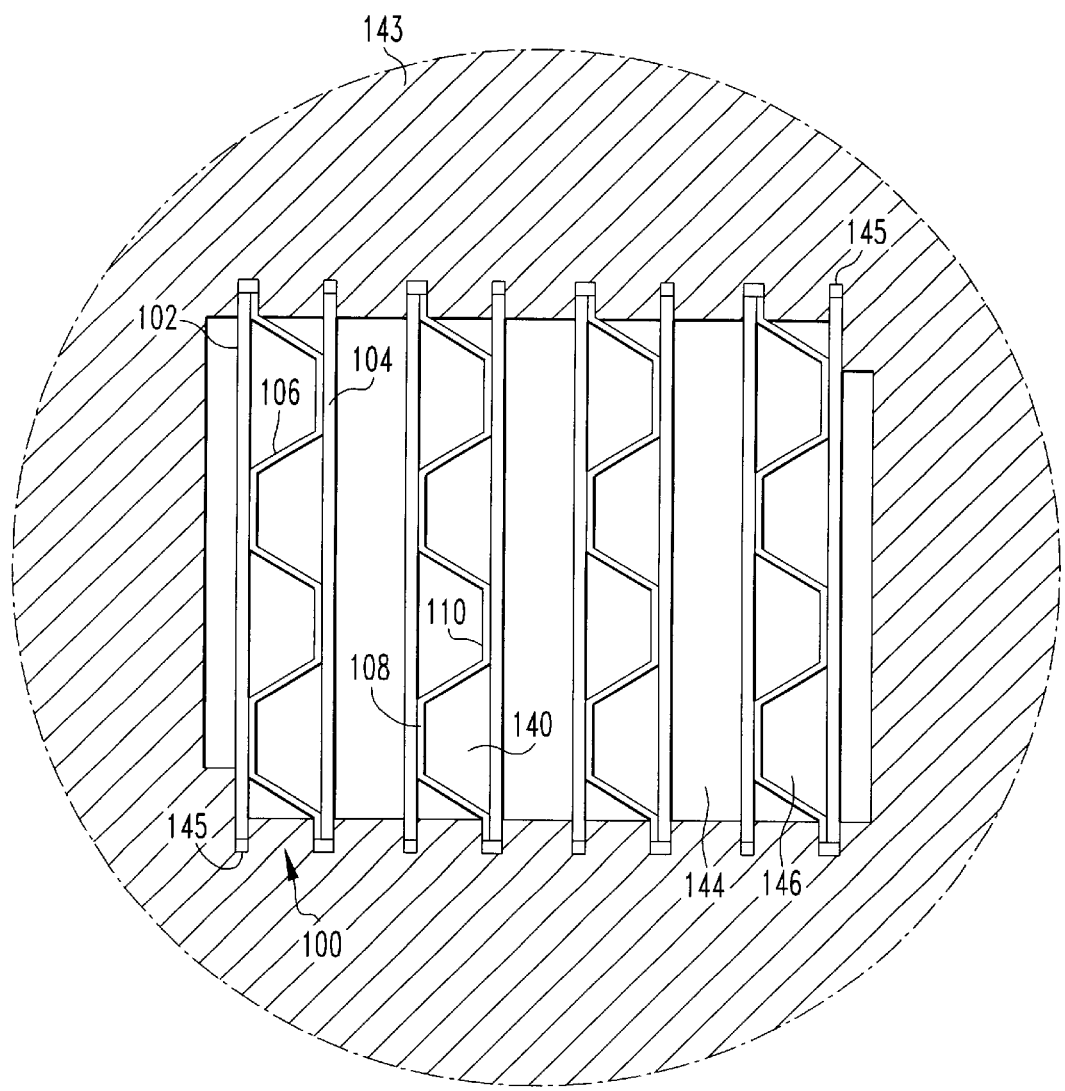
FIG. 3 is a cross-sectional view of the catalytic section of the combustor of FIG. 2 taken along the lines 3—3 thereof.

The cooling channels 146 are respectively formed from a corrugated panel 100 that can be better appreciated from FIG. 3. The corrugated panel 100 has a substantially rectangular cross-section and is formed from a top plate 102 and a bottom plate 104 attached to and affixed together by an undulating member 106 alternately forming ridges 108 and grooves 110 that respectively attach to the top and bottom plates 102 and 104 respectively by, for example, welding or brazing.

The preferred embodiment illustrated in FIGS. 2 and 3 comprises a tandem array of elongated, spaced panels 100 of substantially rectangular cross-section, brazed to an upstream header plate 141 shown in FIG. 2, and laterally supported by grooved side plates or walls 143 shown in FIG. 3. The outside surfaces of each panel 100 are coated with a catalyst (e.g., Pt, Pd, Os). The insides of the panels are rigidized by a corrugated undulated member 106 prebrazed to the uncoated internal surface of the panel which is formed by the top plate 102 and bottom plate 104. Cooling air flows into the corrugations from the chamber or plenum 140 upstream of the header plate 141. Rich fuel/air mixture in the fuel/air mixing plenum 142 is introduced laterally into the array of catalytically-lined channels 146, separating the panels 100 just downstream of the header plate 141. The mixture is then caused to flow axially over the catalyst-coated panel surfaces. Cooling air inside the panels exits at the downstream face 148 where it is mixed with the fuel/air mixture that has traversed the catalyst bed.

The term "tandem" as used herein is intended to refer to a stacked array of alternating cooling and catalytically-lined channels or passages. Though the channels are shown with a horizontal orientation, it should be appreciated that they will function equally as well if rotated 90° to a vertical orientation.

The corrugated panels are inherently rigid because of their trusslike internal stiffening 106 shown in FIG. 3. The open truss structure provides built in channels for unimpeded cooling air, essential for support structure and catalyst cooling. Lateral edges of the panels are trimmed to fit grooves 145 in the side plates 143 for edge support along the entire length of the panel. For added stiffening, the undulated member 106 extends substantially across the entire width of the top and bottom plates 102 and 104 and is secured at one end in the notch 145 that anchors the lower plate and at the other end in the notch 145 that anchors the upper plate 102. High temperature performance is assured by selection of oxidation-resistant substrate material such as Alloy 214 (UNS N07214) or Alloy 230 (UNS N06230). Vacuum-brazing using high temperature nickel braze alloy (e.g., BNi-5) ensures panel integrity during the high temperature catalytic coat processing as well as in long term combustor service. Typical web thickness of the undulated member is 0.005 inches (0.0127 cm). Typical panel thickness for the top and bottom plates 102 and 104 is 0.012 inches (0.03048 cm). However, it should be appreciated that other materials and dimensions can be employed.

Figure 4:
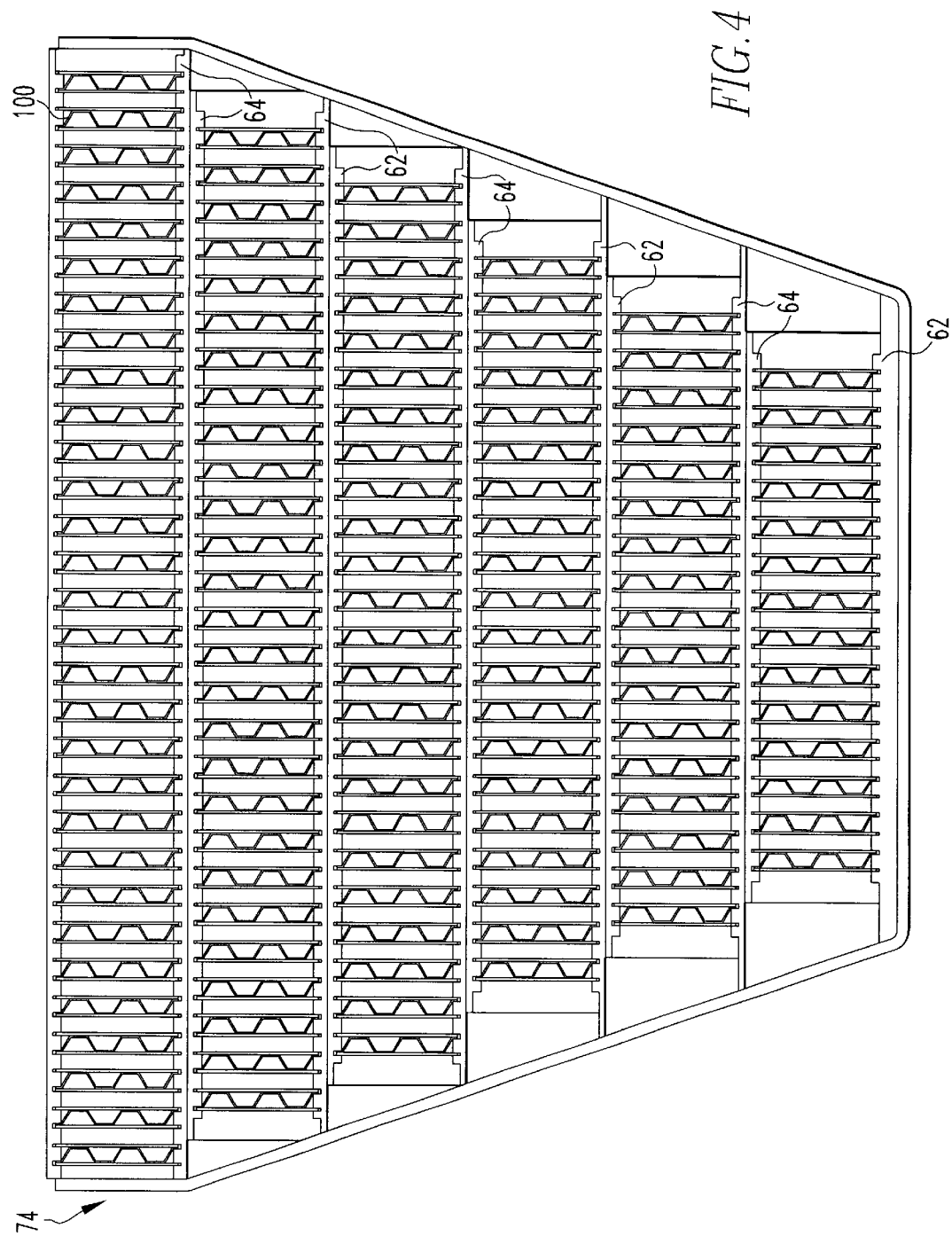
FIG. 4 is a frontal view of one embodiment of a scaled-up hexagonal catalytic module in accordance with this invention that can be situated about a pilot nozzle in a combustor in accordance with this invention.
Figure 6:
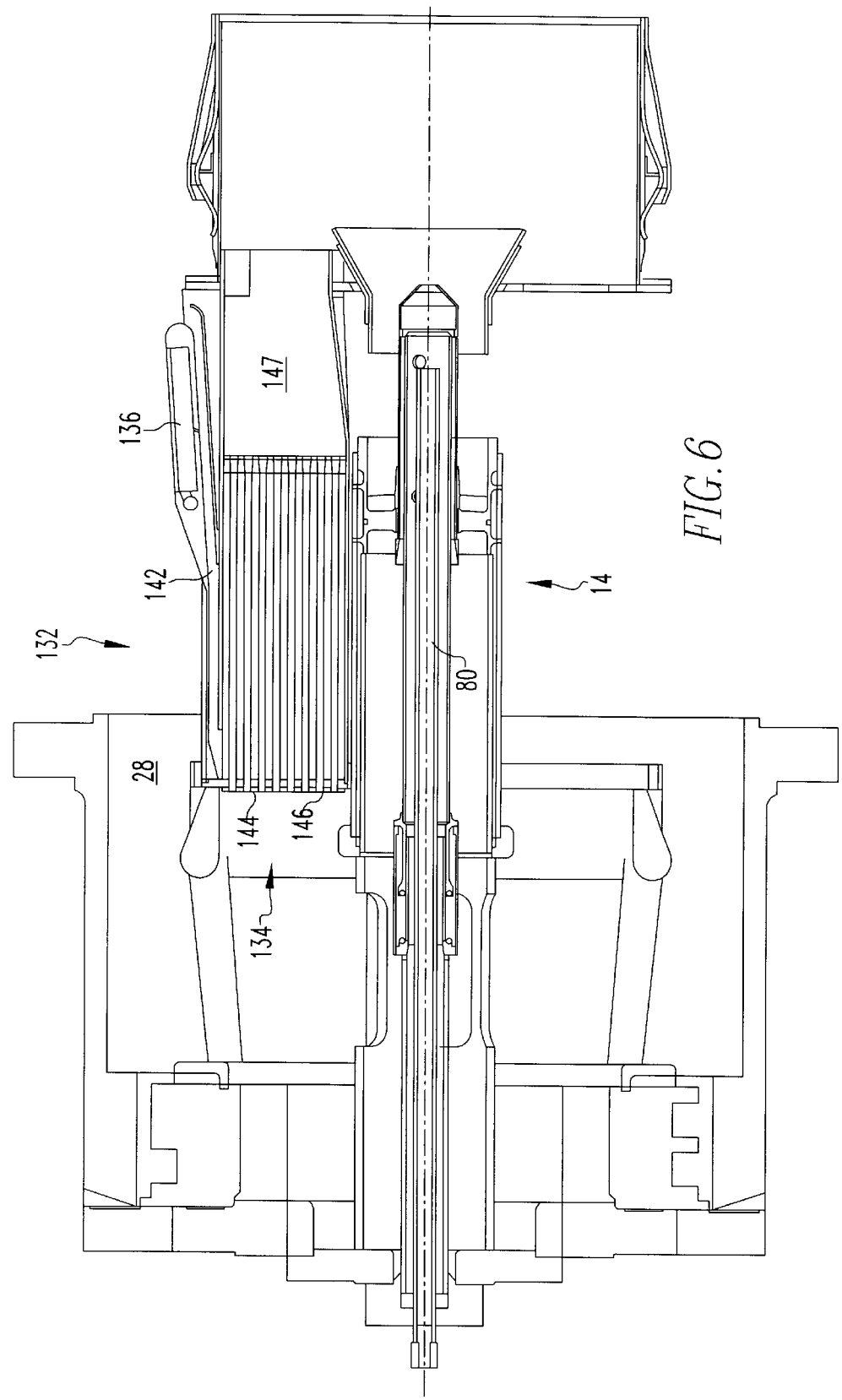
FIG. 6 is a side cutaway view of one catalytic module of this invention incorporated into a combustor.

FIG. 4 illustrates a hexagonal (almost trapezoidal) section 74 of a catalytic assembly portion 132 constructed by combining a plurality of corrugated panels 100. The corrugated panels 100 are preferably organized into a plurality of rows within the hexagonal section 74, with each row having a first support wall 62 and a second support wall 64 which secure the top plates and bottom plates in position in their corresponding grooves. The first and second support walls 62 and 64 form the side walls 143 previously described. Preferably, the grooves in the side walls 143 are deeper than required to seat the top and bottom plates 102 and 104 to allow for thermal expansion. As before, the corrugated subassemblies 100 preferably have an elongated profile when viewed from one end with a preferred elongated profile being substantially rectangular. A number of the hexagonal sections 74 can be supported around the pilot nozzle 80 of the combustor 14 as shown in FIG. 6.

Figure 5:
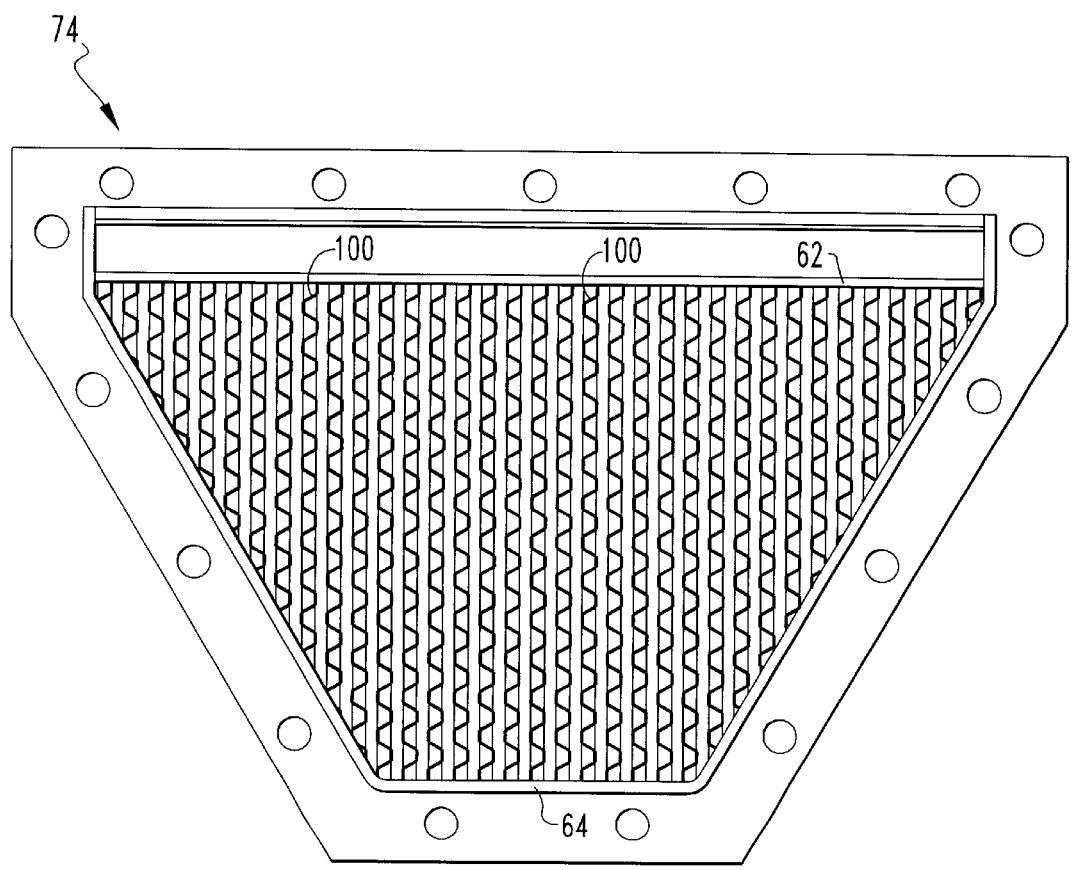
FIG. 5 is a frontal view of a second embodiment of a hexagonal module that can be employed with this invention.

FIG. 5 illustrates another embodiment of a hexagonal (almost trapezoidal) section 74 where the corrugated panels span the width of the hexagonal section. Like reference characters are intended to denote similar elements. The stiffness of the panels, the rigid supports on both sides and the notches in the support walls 62 and 64 enable the corrugated panels 100 to span the width of the hexagonal section 74. This arrangement requires fewer parts and greatly simplifies manufacture. The embodiment shown in FIG. 5 is equivalent to 306 coated tubes and comprises ⅙ of a commercial combustor basket.

While specific embodiments of the invention have been described in detail, it will be appreciated by those skilled in the art that various modifications and alternatives to those details could be developed in light of the overall teachings of the disclosure. For example, alternate geometry's can be employed such as variations in corrugated web geometry, panel geometry and module geometry. Also, while the preferred embodiment involves brazing of panels 100 to header plate 141, these components could also be joined by welding. Alternately, they may not be metallurgically joined but may be contained by inserting the ends of the panels 100 into close fitting pockets 149 machined in the header plate 141 as shown in FIG. 2A. The fit would be sized to control air leakage to the fuel rich air mixture. Also, while the exit end of the panels may be flared to promote mixing and reduce bluff-body and tendancy for flame holding, it may also be square. Such square configuration may be appropriate for the unbrazed option to facilitate panel containment. In particular, the square configuration could be contained by a downstream plate 150 with pockets and flares located near the downstream face 148. Such configuration is shown in FIG. 2B. Fuel air mixture could combine with cooling air via holes 151 in the panel ends. In addition, this invention can be employed in other catalytic reactors, for example, those used to enhance chemical processes for various fluids or fluid combinations and with various or no panel coatings. Accordingly, this invention is not intended to be limited to an application to catalytic combustors for combustion turbines and the particular embodiments disclosed are meant to be illustrative only and not limiting as to the scope of the invention which is to be given the full breadth of the appended claims and any and all equivalents thereof. The invention thus described provides a catalytic support structure of a corrugated panel geometry that is vibration resistant as a result of its inherent trusslike stiffness. The extensive linear edges readily engage in the side wall grooves and provide external lateral support for vibration resistance while, at the same time, allowing for axial and transverse differential thermal expansion. Furthermore, the catalytic support structure based on broad panel fabrication is relatively easy to manufacture.

What is claimed is:

1. A combustion turbine combustor having an elongated catalytic section comprising a tandem arrangement of passages defined in part by first and second side walls, with each of said side walls having a plurality of grooves extending in the direction of the elongated dimension of the catalytic section, alternate passages in said tandem arrangement comprising a top plate and a bottom plate attached to and affixed together by an undulating member alternately forming ridges and grooves that respectively attach to the top and bottom plates to form a corrugated member, the undulating member extending substantially from a first laterally extending side to a second laterally extending side of the top and bottom plates relative to the elongated dimension, each of said corrugated members being supported on the first laterally extending side within at least one of the grooves in the first side wall and on the second laterally extending side within at least one of the grooves in the second side wall.

2. The combustion turbine combustor of claim 1 wherein the first laterally extending side of the top plate is supported within a first groove in the first side wall and the first laterally extending side of the bottom plate is supported within a second groove in the first side wall.

3. The combustion turbine combustor of claim 2 wherein the second laterally extending side of the top plate is supported within a first groove in the second side wall and the second laterally extending side of the bottom plate is supported within a second groove in the second side wall.

4. The combustion turbine combustor of claim 3 wherein one end of the undulating member is supported within either the first or second groove of the first side wall and the other end of the undulating member is supported within either the first or second groove of the second side wall.

5. The combustion turbine combustor of claim 2 wherein the grooves in the first side wall are deeper than the penetration of the top plate and bottom plate to allow for thermal expansion.

6. The combustion turbine combustor of claim 1 including a catalyst affixed to a side of the top and bottom plates opposite a side of the top and bottom plates interfacing with the undulating member, of at least one of the corrugated members.

7. The combustion turbine combustor of claim 6 wherein the passages defined by the corrugated members are configured to carry cooling air.

8. The combustion turbine combustor of claim 1 wherein the undulating member is affixed to the top and bottom plates by vacuum brazing.

9. The combustion turbine combustor of claim 1 wherein the passages between corrugated members are substantially unobstructed.

10. The combustion turbine combustor of claim 1 wherein said corrugated members are connected at a first end to an upstream header.

11. The combustion turbine combustor of claim 10 including a fuel/air mixture plenum in fluid communication with the alternate passages in between the corrugated members down stream of the header and a cooling air plenum in fluid communication with the undulating members through the header.

12. The combustion turbine combustor of claim 1, wherein said corrugated members are contained at a first end by close fitting pockets of an upstream header.

13. The combustion turbine combustor of claim 12, wherein said corrugated members are contained at a second end by close fitting pockets of a downstream header and wherein separate gas flows can be combined via holes in the panels, proximate a downstream end of the panels.

14. A combustion turbine having a combustor including an elongated catalytic section comprising a tandem arrangement of passages defined in part by first and second side walls, with each of said side walls having a plurality of grooves extending in the direction of the elongated dimension of the catalytic section, alternate passages in said tandem arrangement comprising a top plate and a bottom plate attached to and affixed together by an undulating member alternately forming ridges and grooves that respectively attach to the top and bottom plates to form a corrugated member, the undulating member extending substantially from a first laterally extending side to a second laterally extending side of the top and bottom plates relative to the elongated dimension, each of said corrugated members being supported on the first laterally extending side within at least one of the grooves in the first side wall and on the second laterally extending side within at least one of the grooves in the second side wall.

15. The combustion turbine of claim 14 wherein the first laterally extending side of the top plate is supported within a first groove in the first side wall and the first laterally extending side of the bottom plate is supported within a second groove in the first side wall.

16. The combustion turbine of claim 15 wherein the second laterally extending side of the top plate is supported within a first groove in the second side wall and the second laterally extending side of the bottom plate is supported within a second groove in the second side wall.

17. The combustion turbine of claim 16 wherein one end of the undulating member is supported within either the first or second groove of the first side wall and the other end of the undulating member is supported within either the first or second groove of the second side wall.

18. The combustion turbine of claim 15 wherein the grooves in the first side wall are deeper than the penetration of the top plate and bottom plate to allow for thermal expansion.

19. The combustion turbine of claim 14 including a catalyst affixed to a side of the top and bottom plates opposite a side of the top and bottom plates interfacing with the undulating member, of at least one of the corrugated members.

20. The combustion turbine of claim 19 wherein the passages defined by the corrugated members are configured to carry cooling air.

21. The combustion turbine of claim 14 wherein the undulating member is affixed to the top and bottom plates by vacuum brazing.

22. The combustion turbine of claim 14 wherein the passages between corrugated members are substantially unobstructed.

23. The combustion turbine of claim 14 wherein said corrugated members are connected at a first end to an upstream header.

24. The combustion turbine of claim 14 including a fuel/air mixture plenum in fluid communication with the alternate passages in between the corrugated members down stream of the header and a cooling air plenum in fluid communication with the undulating members through the header.

25. The combustion turbine of claim 14, wherein said corrugated members are contained at a first end by close fitting pockets of an upstream header.

26. The combustion turbine of claim 13, wherein said corrugated members are contained at a second end by close fitting pockets of a downstream header and wherein separate gas flows can be combined via holes in the panels, proximate a downstream end of the panels.

27. A chemical catalytic reactor including an elongated catalytic section comprising a tandem arrangement of passages defined in part by first and second side walls, with each of said side walls having a plurality of grooves extending in the direction of the elongated dimension of the catalytic section, alternate passages in said tandem arrangement comprising a top plate and a bottom plate attached to and affixed together by an undulating member alternately forming ridges and grooves that respectively attach to the top and bottom plates to form a corrugated member, the undulating member extending substantially from a first laterally extending side to a second laterally extending side of the top and bottom plates relative to the elongated dimension, each of said corrugated members being supported on the first laterally extending side within at least one of the grooves in the first side wall and on the second laterally extending side within at least one of the grooves in the second side wall.

* * * * *